(12) United States Patent
Roth

(10) Patent No.: US 7,781,004 B2
(45) Date of Patent: Aug. 24, 2010

(54) METHOD AND APPARATUS FOR APPLYING CARBON MONOXIDE TO SUPPRESS MICROBE ACTIVITY IN MEAT STORAGE ENCLOSURES

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 989 days.

(21) Appl. No.: 11/434,311

(22) Filed: May 15, 2006

(65) Prior Publication Data

US 2006/0228450 A1    Oct. 12, 2006

Related U.S. Application Data

(63) Continuation-in-part of application No. 10/315,453, filed on Dec. 10, 2002, now Pat. No. 7,045,162.

(51) Int. Cl.
*A23B 4/16* (2006.01)
(52) U.S. Cl. ............... 426/312; 426/315; 426/231; 426/641
(58) Field of Classification Search ............... 426/231, 426/319, 332, 335, 641, 646
See application file for complete search history.

(56) References Cited

U.S. PATENT DOCUMENTS

| | | | |
|---|---|---|---|
| 3,023,109 A * | 2/1962 | Hines | ............... 426/263 |
| 3,117,427 A | 1/1964 | Gessel | |
| 3,122,748 A | 2/1964 | Beebe, Jr. | |
| 3,547,576 A | 12/1970 | Sheikh | |
| 4,777,018 A | 10/1988 | Auchincloss | |
| 4,919,955 A | 4/1990 | Mitchell | |
| 5,163,361 A | 11/1992 | Fox et al. | |

(Continued)

FOREIGN PATENT DOCUMENTS

JP        58047429 A       3/1983

(Continued)

OTHER PUBLICATIONS

English translation JP 61135552; p. 1-11; 1986.*

(Continued)

*Primary Examiner*—Drew E Becker
*Assistant Examiner*—Steven Leff
(74) *Attorney, Agent, or Firm*—The Culbertson Group, P.C.; Russell D. Culbertson

(57) ABSTRACT

One or more meat products are positioned in a meat chilling enclosure in which cooled air is added to cool the contents of the enclosure. A water spray including a desired carbon monoxide content in solution is introduced into the meat chilling enclosure. The desired carbon monoxide content may comprise no more than approximately the maximum carbon monoxide content that is held in solution in the spray water at approximately the temperature at which the spray water is introduced into the meat chilling enclosure. Alternatively, carbon monoxide held in solution in the spray water may be limited to approximately the maximum carbon monoxide content that is held in solution in the spray water at a maximum temperature maintained in the meat chilling enclosure. A pH increasing material such as ammonia gas or ammonium hydroxide solution may also be added to the meat chilling enclosure to produce and maintain a desired ammonia gas content in the enclosure atmosphere.

20 Claims, 3 Drawing Sheets

U.S. PATENT DOCUMENTS

| | | |
|---|---|---|
| 5,174,967 A | 12/1992 | Fukuhara |
| 5,318,789 A | 6/1994 | Nakagawa et al. |
| 5,389,390 A | 2/1995 | Kross |
| 5,393,547 A | 2/1995 | Balaban et al. |
| 5,433,142 A | 7/1995 | Roth |
| 5,514,344 A | 5/1996 | D'Agaro |
| 5,871,795 A | 2/1999 | Roth |
| 6,142,067 A | 11/2000 | Roth |
| 6,387,426 B1 | 5/2002 | Roth |
| 2002/0127314 A1* | 9/2002 | Roth .................. 426/319 |
| 2004/0109925 A1* | 6/2004 | Roth .................. 426/319 |
| 2004/0185153 A1* | 9/2004 | Hekal .................. 426/392 |
| 2004/0241296 A1* | 12/2004 | Roth .................. 426/331 |
| 2006/0286221 A1* | 12/2006 | Roth et al. .................. 426/263 |
| 2006/0286222 A1* | 12/2006 | Roth .................. 426/263 |
| 2006/0292272 A1* | 12/2006 | Roth .................. 426/263 |
| 2007/0014901 A1* | 1/2007 | Roth .................. 426/263 |
| 2008/0057165 A1* | 3/2008 | Roth .................. 426/281 |
| 2008/0124436 A1* | 5/2008 | Roth et al. .................. 426/266 |

FOREIGN PATENT DOCUMENTS

| | | |
|---|---|---|
| JP | 61135552 A * | 6/1986 |
| JP | SHO6439965 | 2/1989 |
| JP | 03004737 A | 1/1991 |
| SU | 2081186/13 | 12/1976 |
| WO | WO 93/17562 | 9/1993 |

OTHER PUBLICATIONS

Author Unknown, "Mott Sparger Application; pH Control—Neutralizing Alkaline Solutions," Mott Industrial, Division of Mott Corporation, Feb. 1996 (2 Pages).

Author Unknown, "A Guide to Advanced Steam Sparging," Mott Industrial, Division of Mott Industrial, Feb. 1996 (6 Pages).

Author Unknown, "Sparging/Gas-Liquid Contacting Design Guide & Part Selection," Mott Corporation, Feb. 1996 (11 Pages).

* cited by examiner

METHOD AND APPARATUS FOR APPLYING CARBON MONOXIDE TO SUPPRESS MICROBE ACTIVITY IN MEAT STORAGE ENCLOSURES

CROSS-REFERENCE TO RELATED APPLICATION

This application is a continuation-in-part of U.S. application Ser. No. 10/315,453, filed Dec. 10, 2002, to be issued as U.S. Pat. No. 7,045,162. The Applicant claims priority from this prior application under 35 U.S.C. §120. The entire content of this prior application is also incorporated herein by this reference.

TECHNICAL FIELD OF THE INVENTION

This invention relates to microbe suppression in foodstuffs. More particularly, the invention relates to the suppression of microbe propagation in meat storage enclosures, especially enclosures in which meat is chilled.

BACKGROUND OF THE INVENTION

Modern meat processing facilities employ special practices and equipment to help ensure that the meat being processed does not become contaminated with pathogenic bacteria such as certain strains of *E. Coli, Salmonella*, and *Staph* bacteria, for example. However, even with careful handling, meat products are almost inevitably exposed to pathogenic microbes in the course of processing. Furthermore, nonpathogenic bacteria are also inevitably present in the meat being processed and propagate as part of the natural decay process of the meat. Meat processing facilities chill meat quickly after slaughter to help reduce the growth rate of all types of bacteria in the meat product and to slow the natural decay processes in the meat. However, simply chilling meat does not kill most types of bacteria that may be present in meat, and allows many types of microbes to continue to propagate.

Meat processing generally includes a series of initial processing steps and then a number of final processing steps which result in the final meat products. In the initial processing steps, the animal is slaughtered, skinned, and cleaned to produce a whole carcass which is then usually cut into halves or sides. These whole or substantially whole carcasses are then cooled to an initial processing temperature and stored at that initial processing temperature for a period of time. After this initial refrigerated storage, the whole carcasses are moved on to the final processing steps in which the carcasses are cut down by butchering or trimming operations into the final products such as steaks, roasts, filets, and more thoroughly comminuted products such as ground meat. Final processing may also include special processes that recover lean meat from trimmings left after conventional trimming operations.

In the initial processing, a carcass may be steamed in a steam cabinet and subjected to antibacterial washes while the carcass is still at or near slaughter temperature. This initial cleaning helps reduce the number of viable microbes on the carcass. The cooling associated with initial processing is generally performed after these initial cleaning and antibacterial steps to take the carcass down from the slaughter temperature of approximately 100 degrees Fahrenheit (for beef) to the initial storage temperature usually between 35 to 45 degrees Fahrenheit. This cooling is normally accomplished in two separate steps for beef carcasses using two different cooling systems. In the first cooling step, the hot (slaughter temperature) carcass is placed in a first cooling chamber commonly referred to as a "hot box" to begin the cooling process. After being cooled to some extent in the hot box, the carcass is transferred to a separate "holding cooler" for reducing the temperature of the carcass further and then holding the carcass within the desired temperature range for a period of time normally between 24 and 48 hours. From the holding cooler, the carcass is generally transferred to a location for final processing, either at the slaughter facility or at a separate final processing facility.

Hot boxes and holding coolers associated with initial meat processing operations commonly include a system for introducing a fine mist of chilled water into the enclosure. This water is added to the respective enclosure for the purpose of controlling shrinkage in the carcasses held in the enclosure. These misting systems generally include a supply of water, a chilling system for the water, and some arrangement for spraying the water into the enclosure in a fine mist.

Although the whole carcass may be subjected to processes immediately after slaughter to reduce microbe content on the carcass, these anti-microbial efforts inevitably leave viable microbes on the carcass for the initial cooling steps. The carcass itself may thus be a source of contamination for the hot box and holding cooler. A hot box, holding cooler, or other enclosure for meat products may also be contaminated with microbes introduced during service operations, with airborne microbes, or with microbes introduced into the enclosure through the water used in the misting system for the enclosure. The contaminating microbes may then spread throughout the enclosure and ultimately spread to previously uncontaminated meat products held in the enclosure. Thus, it is desirable to provide a method and apparatus for suppressing microbial activity or growth in the initial cooling enclosures and other enclosures in which meat may be held.

Prior hot box or holding cooler water misting systems have employed small quantities of chlorine in the misting water to help control microbial activity in the misting water, and thus help prevent the introduction of microbes into the respective enclosure through the misting water. Chlorinated misting water is disfavored, however, due to the detrimental effect of chlorine on the enclosure and associated equipment. Also, chlorinated misting water provides an antibacterial affect generally only on surfaces the mist reaches. Chlorinated misting water also may have a detrimental effect on the meat products stored in the enclosure. It is therefore desirable to provide an alternative and more effective method and system for suppressing microbial activity in enclosures used to hold meat products, especially coolers associated with initial meat processing operations.

SUMMARY OF THE INVENTION

The present invention includes a method and apparatus for controlling microbe growth in meat chilling enclosures, particularly, hot boxes and holding coolers. The invention employs carbon monoxide in solution in water that is sprayed into the respective meat chilling enclosure. In particular, the carbon monoxide solution may be used in water that makes up at least a portion of the spray water used in a shrinkage control system.

In accordance with one preferred form of the invention, one or more meat products are positioned in a meat chilling enclosure in which cooled air is circulated to cool the contents of the enclosure. One preferred method includes introducing a water spray into the meat chilling enclosure, this sprayed water includes a desired carbon monoxide content in solution. The desired carbon monoxide content may comprise no more than approximately the maximum carbon monoxide content that is held in solution in the spray water at approximately the temperature at which the spray water is introduced into the meat chilling enclosure. Other preferred forms of the invention may limit the amount of carbon monoxide held in solution in the spray water to approximately the maximum carbon monoxide content that is held in solution in the spray water at a maximum temperature maintained in the meat chilling enclosure.

As used in this document and the accompanying claims, the water that is sprayed into the meat chilling enclosure according to the invention will be referred to generally as "spray water." According to the invention, the "spray water" is made up of water and any material held in solution in the water, including carbon monoxide and any other materials that may be held in, or carried by, the water. The water included in the "spray water" may be referred to as "makeup water." It should be noted that the designation "spray water" is adopted for purposes of this application and the accompanying claims simply as a convenient designation for the material and is not intended to convey any limitation as to the location of the material, the manner in which it is released into a meat chilling enclosure, or any other characteristic of the material.

One preferred form of the invention also includes introducing a pH increasing material comprising either ammonia gas or an ammonium hydroxide solution into the meat chilling enclosure. The pH increasing material is introduced to create a desired ammonia gas content in an enclosure atmosphere within the meat chilling enclosure. Where the pH increasing material is used, it may be included as ammonium hydroxide solution within the spray water itself. Alternatively, the pH increasing material, either ammonia gas or ammonium hydroxide solution, may be introduced into the meat chilling enclosure separately from the spray water. In forms of the invention that add and maintain a desired ammonia gas content in the enclosure atmosphere, the ammonia gas atmosphere mat be circulated through air handling enclosures associated with a heat exchanger system for the meat chilling enclosure. Also, both the carbon monoxide gas content and ammonia gas content of the enclosure atmosphere may be monitored and the monitor signals may be used for controlling the addition of further spray water and/or other materials into the meat chilling enclosure.

It is believed that the carbon monoxide content in the spray water helps inhibit microbe propagation, that is, suppress microbe activity, in the moisture in the meat chilling enclosure. It is also believed that the ammonia gas content in the enclosure atmosphere helps increase the pH of moisture within the meat chilling enclosure and thereby also inhibit microbe propagation in the meat chilling enclosure. This microbe inhibiting effect is obtained without the use of materials which are detrimental to the meat products held in the meat chilling enclosure or to the meat chilling enclosure itself and related equipment.

An apparatus according to the invention includes a supply of spray water containing carbon monoxide in solution and at least one release port located to release the spray water into a meat chilling enclosure. A flow control arrangement is also included in the apparatus for directing the spray water into the meat chilling enclosure through the release port. Additional components may be included in an apparatus according to the invention to add ammonia gas or ammonium hydroxide solution to the meat chilling enclosure to produce and maintain a desired ammonia gas content in the enclosure atmosphere.

These and other advantages and features of the invention will be apparent from the following description of the preferred embodiments, considered along with the accompanying drawings.

DESCRIPTION OF PREFERRED EMBODIMENTS

Figure 1:
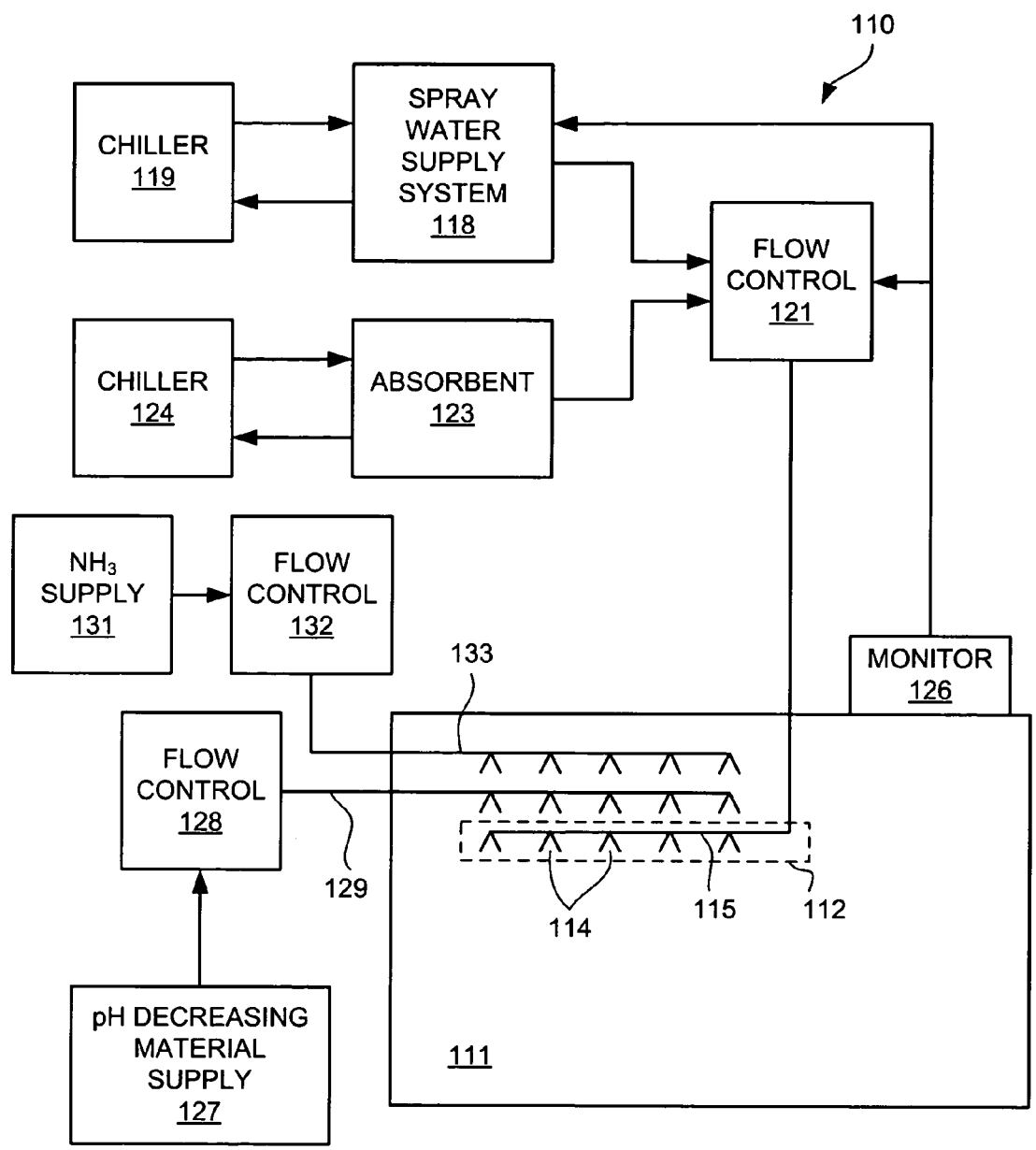
FIG. 1 is a diagrammatic representation of an apparatus embodying the principles of the invention for suppressing microbe activity in an enclosure containing meat products.

Referring to FIG. 1, an apparatus 110 embodying the principles of the invention is adapted to introduce spray water into an enclosure 111. This spray water may be introduced for any reason, including for the purpose of helping control shrinkage in meat products held in the enclosure, and particularly substantially whole carcasses being chilled in the enclosure. The apparatus 110 shown in FIG. 1 is particularly suited for use with chillers such as a hot box or holding cooler used in initial meat processing operations, or holding coolers used in final meat processing operations. However, the invention is not limited to these applications. Rather, enclosure 111 may be any enclosure for containing meat products, whether the meat product is in the form of substantially whole carcasses, coarsely comminuted meat products such as steaks, roasts, and filets, or highly comminuted meat products such as ground beef. FIG. 1 shows treatment apparatus 110 associated with a single enclosure 111. However, it will be appreciated that a treatment apparatus according to the invention may be used to introduce spray water into a series of separate enclosures.

Apparatus 110 includes a spray water release arrangement 112 associated with each enclosure 111 to be treated. Release arrangement 112 is adapted to release the spray water either directly or indirectly into the enclosure through one or more release ports 114. FIG. 1 shows release arrangement 112 made up of a series of release ports 114 connected to a distribution conduit 115 mounted within enclosure 111. Release ports 114 preferably comprise nozzles adapted to release water into enclosure 111 in the form of a fine mist. Release ports 114 may be situated in enclosure 111 in any location to release the water into the enclosure. In one preferred arrangement, release ports 114 are situated so as to direct the preferred fine mist directly onto meat products stored in the enclosure. Whether release ports 114 comprise spray nozzles or other release devices, the devices themselves may perform a flow control function. For example, where the release ports 114 comprise spray nozzles adapted to release a fine mist of water into enclosure 111, the nozzles may comprise constant flow rate nozzles adapted to provide a desired flow rate of water into the enclosure over a given input pressure range.

Apparatus 110 shown in FIG. 1 includes a spray water supply system 118 which provides the spray water to be released into enclosure 111. According to the invention, spray water supply system 118 adds sufficient carbon monoxide to the spray water to produce a desired carbon monoxide content in solution in the spray water. Spray water supply system 118 may also produce an ammonium hydroxide solution in the spray water in addition to producing the desired carbon monoxide content. A specific example of a spray water supply system form producing both a desired carbon monoxide content and ammonium hydroxide content in the spray water will be described below with reference to FIG. 2. Preferred forms of the invention control the temperature of the spray water released into the meat product enclosure, such as enclosure 111. FIG. 1 shows a chiller 119 associated with spray water supply system 118 for holding the temperature of the spray water at a suitable temperature for release into enclosure 111. This temperature will be a temperature approximately equal to the desired temperature within enclosure 111. Chiller 119 may be any device suitable for maintaining the temperature of the spray water introduced into enclosure 111 from spray water supply 118.

FIG. 1 also shows that apparatus 110 includes a flow control arrangement 121 connected between spray water supply 118 and release ports 114. Flow control arrangement 121 comprises an arrangement of valves or other flow control devices for controlling the release of spray water into enclosure 111. The devices making up flow control arrangement 121 may be manually operated or may be automated to introduce spray water into enclosure 111. Particularly where the spray water includes an ammonium hydroxide solution, the flow control arrangement 121 may be automated to help maintain the desired pH increasing gas content in the enclosure atmosphere. A particular flow control arrangement will be described below for purposes of example with reference to FIG. 2. It will be appreciated that although flow control arrangement 121 is shown separate from release arrangement 112, flow control elements for performing the functions provided by the flow control arrangement may be integrated with the release device, particularly with nozzles included with the spray water release arrangement.

Preferably, the spray water system according to the present invention, and the meat chilling enclosure 111 itself are operated to ensure that carbon monoxide added in the spray water is maintained in solution in the spray water in the enclosure. However, there may be some instances in which carbon monoxide is released into the enclosure 111 in gas form, either directly or from the spray water. The form of the invention shown in FIG. 1 includes an arrangement for removing either carbon monoxide gas or ammonia gas, or both, from the enclosure atmosphere should it become necessary or desirable. The removal arrangement shown in FIG. 1 includes an arrangement for absorbing carbon monoxide gas and/or ammonia gas from the enclosure atmosphere. In particular, FIG. 1 shows an absorbent material supply 123 and a chiller 124 for chilling the absorbent material to a temperature suitable for introducing the material into enclosure 111. The preferred absorbent material comprises water which may be introduced into enclosure 111 through release ports 114 under the control of flow control arrangement 121 as indicated in FIG. 1. In this arrangement, flow control arrangement 121 would fully or partially switch from introducing the spray water from system 118 to introducing the absorbent material in order to reduce the carbon monoxide and/or ammonia gas content in the enclosure atmosphere.

The invention encompasses any suitable arrangement for removing carbon monoxide gas and/or ammonia gas from the enclosure atmosphere and is not limited to the particular arrangement shown in FIG. 1. For example, the invention encompasses a venting arrangement for releasing or withdrawing atmosphere from the enclosure to remove carbon monoxide and/or ammonia gas. Also, carbon monoxide and/or ammonia gas may be absorbed from the enclosure atmosphere while the atmosphere is in the enclosure or while the enclosure atmosphere is temporarily removed from the enclosure. Furthermore, an absorbent material may be introduced into enclosure 111 in arrangements different from that shown in FIG. 1. For example, rather than employing a separate absorbent material supply such as 123 in FIG. 1, spray water system 118 may be adapted to reduce the concentration of ammonium hydroxide and/or carbon monoxide in the spray water, thus leaving the spray water in condition to absorb ammonia gas and/or carbon monoxide gas from the enclosure atmosphere.

Although the apparatus according to the invention may be controlled manually, for example to produce and maintain the desired ammonia gas content in the enclosure atmosphere, alternate forms of the invention may rely on automated control systems. To provide automated control of ammonia gas content in the enclosure atmosphere, a monitor 126 may be associated with enclosure 111 for providing a monitor output indicative of the ammonia gas content in the enclosure atmosphere. This monitor output may be directed to flow control arrangement 121 as indicated in FIG. 1, and the flow control arrangement may include programmable logic controllers (not shown) or other control equipment for controlling the release of spray water and/or absorbent material into enclosure 111. Monitor 126 may also provide a separate monitor output indicative of the carbon monoxide content in the enclosure atmosphere and the control equipment associated with the flow control arrangement 121 may also control the release of spray water and/or absorbent material into enclosure 111 for the purpose of removing carbon monoxide gas from the enclosure atmosphere. As indicated in FIG. 1, the monitor outputs may also or alternatively be directed to control devices associated with spray water supply system 118 to cause the system to reduce the concentration of carbon monoxide and/or ammonium hydroxide in the spray water.

Apparatus 110 shown in FIG. 1 also includes an arrangement for introducing a pH decreasing material into enclosure 111. The preferred pH decreasing material produces a desired pH decreasing gas content in the enclosure atmosphere. The pH decreasing gas may be absorbed into moisture in the enclosure to lower the pH of the moisture. A preferred pH decreasing gas comprises carbon dioxide gas. Carbon dioxide gas dissolves in water to produce carbonic acid ($H_2CO_3$) which reduces the pH of the water. The pH decreasing material may be carbon dioxide itself or a carrier such as carbonated water. In the case of carbonated water, the pH decreasing material may be introduced into enclosure 111 through flow control arrangement 121 and release arrangement 112. Alternatively, the pH decreasing material may be directed from a supply 127 through a separate control arrangement 128 and release arrangement 129 as shown in FIG. 1. In either case, the pH decreasing material may be introduced either directly or indirectly into enclosure 111, and may also be released into air handling enclosures associated with a heat exchange system for the enclosure.

As mentioned above, some preferred forms of the invention include components in spray water supply system 118 for adding a ammonia to the spray water in addition to carbon monoxide. This ammonia added in the spray water may be added in an amount necessary to produce and maintain a desired ammonia gas concentration in the enclosure atmosphere and in the various air handling enclosures, such as conduits for example, associated with enclosure 111 as will be described below in connection with FIG. 3. Alternative forms of the present invention may include alternate arrangements for producing and maintaining a desired ammonia gas content in the enclosure atmosphere. In particular, ammonia gas may be released into enclosure 111 or air handling conduits or other enclosures with enclosure 111, rather then added to spray water which is then released into the enclosure or air handling conduits associated with the enclosure. FIG. 1 shows an ammonia gas supply 131 and a flow control arrangement 132 for this purpose. These components may be in addition to or in lieu of components for adding ammonia gas to the spray water in spray water supply system 118. As yet another alternative, some forms of the invention may include a separate spray water supply system (not shown in the figures) for introducing ammonia gas into a separate stream of spray water which is then released into the meat chilling enclosure. In any case in which a separate system is used to produce the desired ammonia gas content in the enclosure atmosphere, a monitor output indicative of the ammonia gas content in the enclosure atmosphere may be used by the respective system to control the release of ammonia bearing material into the meat chilling enclosure.

Figure 2:
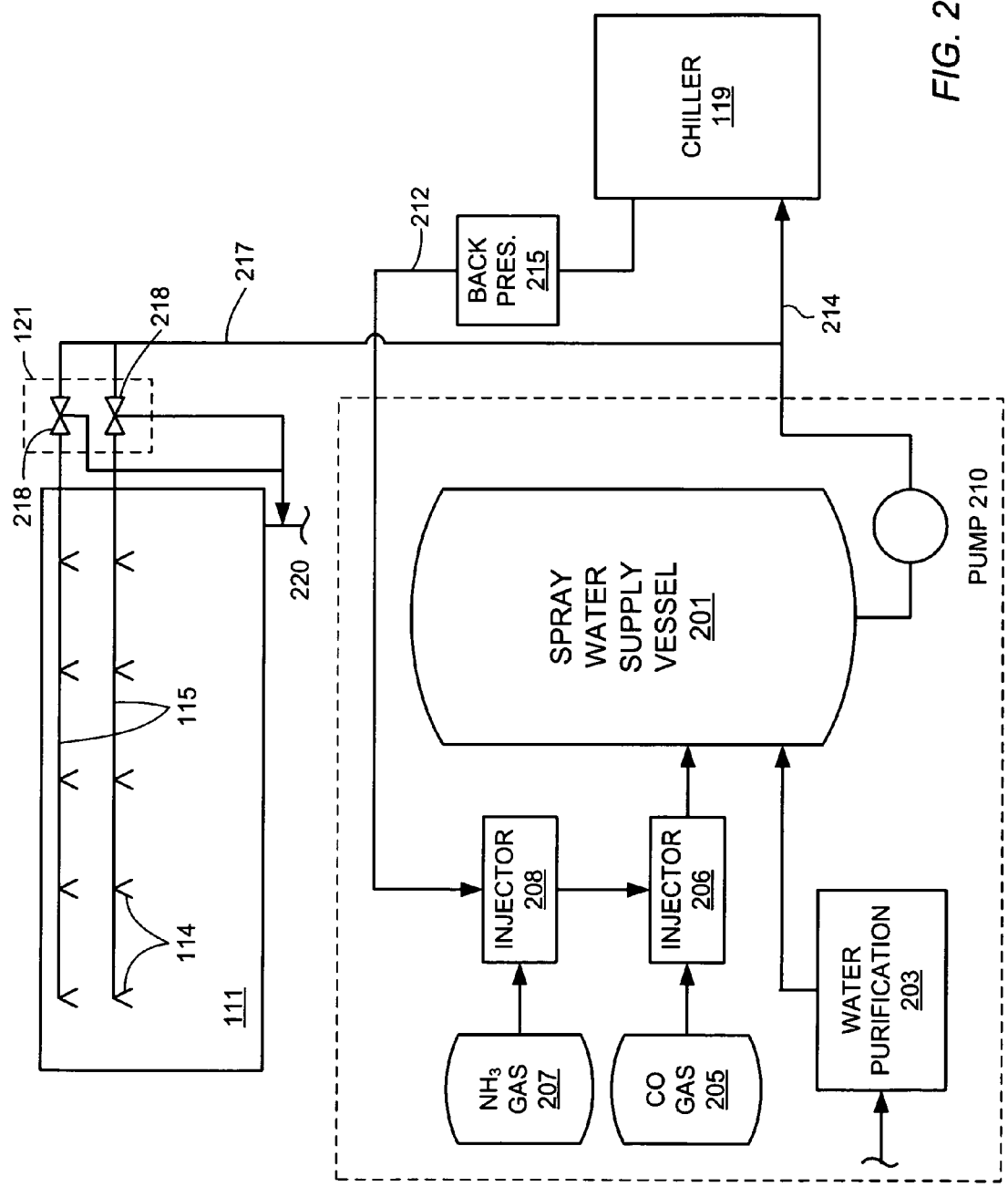
FIG. 2 is a diagrammatic representation of a pH increasing material supply suitable for use in the apparatus shown in FIG. 1.

FIG. 2 shows a more detailed example of a spray water supply system 118 according to one preferred form of the invention. This particular spray water supply system 118 is adapted to produce a spray water including both carbon monoxide and ammonia in solution. Spray water supply system 118 includes a spray water supply vessel 201 for containing the spray water for release into enclosure 111. Makeup water necessary to produce the spray water is provided through a purification arrangement 203, which may be a reverse osmosis system or any other suitable water purification system to ensure the input water is substantially free of contaminants. The spray water supply system 118 shown in FIG. 2 also includes a carbon monoxide gas supply arrangement made up of a carbon monoxide supply vessel 205 and injector 206. An ammonia gas supply arrangement made up of ammonia gas supply 207 and injector 208 is also included in the illustrated spray water supply system 118 shown in FIG. 2. Pump 210 both circulates the spray water through chiller 119 and provides pressure to drive the spray water to flow control arrangement 121 and spray water release ports 114.

Injectors 206 and 208 may comprise any suitable device for allowing the respective gas to be injected or otherwise added to the water circulated from chiller 119 through chiller return line 212. For example each injector 206, 208 may comprise a sparger such as a MOTT GasSaver® inline sparger manufactured by Mott Corporation of Farmington Conn. Alternatively, each injector may comprise a device which allows the respective gas to pass through a semipermeable membrane into the spray water pumped through chiller return line 212. The amount of carbon monoxide added to the water is preferably controlled through suitable control devices associated with carbon monoxide gas supply 205 and/or injector 206 to ensure that substantially all of the carbon monoxide gas goes into solution in the spray water. Similarly, the amount of ammonia gas added to the water is preferably controlled through suitable control devices associated the ammonia supply 207 and /or injector 208 to ensure that substantially all of the added ammonia goes into solution in the water.

The form of spray water supply system 118 shown in FIG. 2 places injectors 206 and 208 in chiller return line 212 which comprises a recycle line from chiller 119 back to vessel 201. Other forms of the invention may add carbon monoxide gas or carbon monoxide gas and ammonia gas at different points in the system to provide the desired solution in the spray water. For example, a carbon monoxide injector or a carbon monoxide injector and an ammonia injector could alternatively be associated with the makeup water supply line from water purification system 203, for adding the desired gas or gasses into the makeup water before reaching vessel 201. Injectors could also be placed in vessel 201 itself. In yet another alternative, the desired carbon monoxide gas or carbon monoxide and ammonia gasses may be added to the spray water as it is directed to the release ports 114 in enclosure 111. This alternate arrangement could eliminate vessel 201 from the spray water supply arrangement 118.

In the arrangement shown in FIG. 2, chiller 119 takes at least a portion of the spray water output from pump 210 through line 214 and chills the material in a suitable heat exchange arrangement. The output from chiller 119 is directed through chiller return line 212 through a suitable back pressure device 215 such as an orifice to the series of injectors 206 and 208, and ultimately back to vessel 201. A suitable probe (not shown) is preferably associated with chiller return line 212 for measuring the carbon monoxide content of the water in the line as well as the pH of the water upstream from injectors 206 and 208. The probe readings may be used to control the amount of carbon monoxide gas and ammonia gas added to the water through the respective injector. For example, the probe readings may be used in controlling a valve (not shown) in the line from the respective gas supply 205, 207 to the respective injector 206, 208.

The spray water is directed to enclosure 111 through line 217 which branches from line 214. Line 217 directs the spray water to a separate control valve 218 for each different conduit 115 and set of release ports 114 used to release the spray water into enclosure 111. Each valve 218 comprises a remotely controlled three-way valve that may direct spray water from line 217 to the respective release conduit 115 or to a drain line 220 associated with enclosure 111. The flow control arrangement 121 in the form of the invention shown in FIG. 2 is made up of valves 218. Pump 210 may also be considered as part of the flow control arrangement in the system shown in FIG. 2 to the extent that the pump may be turned off or its output varied to control the amount of spray water released into enclosure 111. Where the release ports 114 shown in FIG. 2 comprise flow control functionality, the nozzles may also be considered to be part of the flow control arrangement for controlling the release of spray water into enclosure 111.

It will be noted that the flow control arrangement 121 shown in FIG. 2 does not include an input from an absorbent material supply such as supply 123 shown in FIG. 1. In the configuration shown in FIG. 2, a separate system may be connected to enclosure 111 for releasing an absorbent material such as water into the enclosure to absorb excess ammonia gas and/or carbon monoxide gas in the enclosure atmosphere.

It will be appreciated that the system shown in FIG. 2 may include many different fittings and other connections, valves, and other flow control components. These types of components of the system are omitted from FIG. 2 so as not to obscure the invention in unnecessary detail. Also, it should be appreciated that the invention encompasses numerous variations on the arrangement shown in FIG. 2. In particular, some forms of the invention may add only carbon monoxide to the spray water and may not add ammonia. Where the two gasses are added, the order in which they are added may be changed from that indicated in FIG. 2. Also, some preferred forms of the invention may mix carbon monoxide and ammonia and then inject that gas mixture into the spray water to make the desired spray water solution. It is also possible within the scope of the present invention that carbon monoxide may be premixed with water to make a relatively strong carbon monoxide solution which is then added to additional water to make up the desired carbon monoxide content in the spray water. A relatively strong aqueous ammonia solution may similarly be added to additional water to make up the desired ammonia content, if any, in the spray water.

Figure 3:
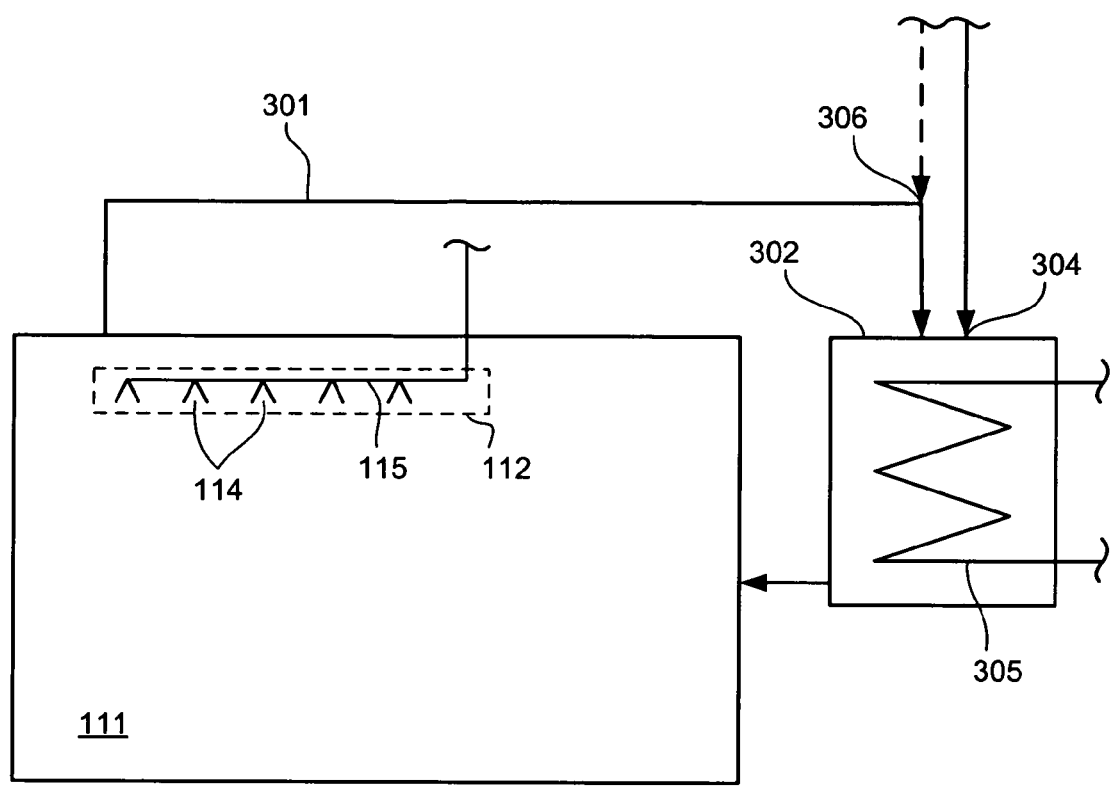
FIG. 3 is a diagrammatic representation of an alternate or additional arrangement for introducing a pH increasing material into an enclosure within the scope of the present invention.

FIG. 3 shows an alternate arrangement for introducing both a carbon monoxide bearing spray water and pH increasing material into enclosure 111. In this alternate arrangement, the carbon monoxide bearing spray water is released into enclosure 111 through release arrangement 112 including conduit 115 and release ports 114, while the pH increasing material is released indirectly into enclosure 111 through enclosures associated with a heat exchange system for enclosure 111. In particular, the pH increasing material is released into the air handling conduits 301 and an enclosure 302 associated with a chilling or refrigeration system for enclosure 111. One release port 304 may be at the enclosure 302 housing refrigerant coils 305 for the enclosure refrigeration system. An alternate release port 306 may be into conduit 301 upstream or downstream of enclosure 302. In either case, releasing the pH increasing material into the refrigeration system air handling enclosures ensures that the pH increasing gas reaches both the enclosure 111 and also the associated equipment which may harbor pathogenic microbes that could ultimately reach the meat products being stored in enclosure 111. This reach of pH increasing gas according to the invention ensures suppression of microbial activity not only in enclosure 111 but also in the air handling equipment associated with the enclosure. It should be noted that even if one or both of the release ports 304 and 306 are used to release pH increasing material into the system made up of enclosure 111, air handling conduits 301 and heat exchange enclosure 305, pH increasing material may still be added to the spray water introduced into the enclosure through release ports 114 shown in FIG. 3. Also, regardless of whether the pH increasing material is released directly into enclosure 111 or through release ports 304 or 306, the pH increasing gas may reach equipment associated with enclosure 111 to provide the desired microbe suppression in that associated equipment. That is, the pH increasing material such as ammonia gas in the system is circulated or otherwise directed through air handling conduits 301, heat exchange enclosure 302, and enclosure 111. The ammonia gas in the enclosure 111, air handling conduits 301, and heat exchange enclosure 302 helps increase the pH of moisture collecting in all of these areas, and thereby inhibit microbial activity in the collected moisture in all of these areas.

The method of the invention may be described now with reference to the apparatus 100 shown in FIG. 1. The method includes introducing a spray water into the enclosure 111 while meat products are contained in the enclosure. The spray water includes a desired amount of carbon monoxide in solution in the water making up the spray water. The carbon monoxide content in the spray water and moisture with which the spray water mixes helps inhibit microbe activity in the spray water and moisture. Preferred forms of the invention maintain the concentration of carbon monoxide in solution in the spray water at a level to prevent the release of significant amounts of carbon monoxide gas into the enclosure atmosphere. In particular, the carbon monoxide content in the spray water is preferably maintained at a level below the solubility limit at temperatures to which the spray water is expected to be subjected in the meat chilling enclosure and related air handling conduits and enclosures. This expected temperature may be the temperature of the spray water as it is introduced into the meat chilling enclosure 111, or it may be some higher maximum temperature expected in the meat chilling enclosure. It should be noted that the solubility level of carbon monoxide gas in the spray water will not only be influenced by the temperature of the water but also the amount of other materials already held in solution in the spray water, such as particularly ammonia. Thus, the use of ammonia in solution in the spray water may reduce the amount of carbon monoxide that may be held in solution in the spray water.

The application of carbon monoxide bearing spray water may be accompanied by introducing a pH increasing material such as ammonia gas or ammonium hydroxide solution, into enclosure 111 to create the desired ammonia gas content in the enclosure atmosphere. The method may also include maintaining the desired ammonia gas content in the enclosure atmosphere while meat products (not shown) are contained in enclosure 111, and maintaining the desired ammonia gas content in the atmosphere directed through conduit 301 and heat exchange enclosure 302.

In the form of the invention shown in FIG. 1, the step of introducing the pH increasing material into the enclosure atmosphere comprises directing the material from the spray water supply system 118 under the control of flow control arrangement 121 to one or more release ports 114 included within enclosure 111. Where the pH increasing material comprises ammonium hydroxide solution, the desired ammonia gas content in the enclosure atmosphere is created as ammonia molecules escape from the ammonium hydroxide solution within enclosure 111. Alternatively to producing the desired pH increasing gas content indirectly in this fashion, the pH increasing gas may be released directly into the enclosure atmosphere. For example, a mixture of gasses including an appropriate fraction of ammonia gas or small amounts of pure ammonia gas may be released directly into the enclosure atmosphere from ammonia supply 131 through flow control arrangement 132 and release arrangement 133.

The step of maintaining the desired ammonia gas content in the enclosure atmosphere is preferably effective for producing a desired pH increase in the moisture in the enclosure. This may be accomplished by adding the pH increasing material for only a very short period of time, or continuously or periodically releasing pH increasing material into enclosure 111 over a relatively long period of time. The time required for this maintaining step may be on the order of a minute where a highly concentrated pH increasing material is used such as a gas including a high ammonia fraction. However, it may be desirable to continuously or periodically add additional pH increasing material because the ammonia gas in the enclosure atmosphere may be continuously absorbed into moisture within the enclosure and associated equipment. For example, the ammonia gas may be absorbed into moisture associated with the meat products contained in the enclosure. Ammonia gas may also be absorbed into moisture collecting on various other surfaces within enclosure 111 and the air handling equipment associated with the enclosure (equipment such as conduit 301 and enclosure 302 in FIG. 3). This increased pH inhibits or suppresses microbe activity in the moisture, wherever the moisture may be located.

A relatively small concentration of ammonia gas in the enclosure atmosphere will produce a sufficient pH increase in moisture within enclosure 111 to provide microbe suppression according to the present invention. The ammonia gas concentration at a maintenance content level effective for producing a pH increase in moisture in the enclosure should be at least 3 parts per million. Higher concentrations may also be employed within the scope of the invention. Where the pH increasing material comprises ammonium hydroxide solution, such a solution having a pH of 8.0 to 11.0 or higher is preferred for producing the desired ammonia gas content.

Generally, it is desirable to increase the pH of independent moisture (moisture not included in a meat product) within the enclosure to a pH above 7.0, and preferably above 8.0. A pH at 8.0 or above will significantly reduce microbe activity within the independent moisture, while lower pH levels will provide a somewhat diminished effect on microbe activity. The invention may produce a pH increase from an initial pH of approximately 5.7 to an increased pH of approximately 7.0 or more in moisture at the surface level of the meat in the enclosure 111. The ammonia gas concentration should not be maintained at a level that would permanently and adversely impact the flavor of the meat products stored in enclosure 111.

The particular concentration of ammonia gas in the enclosure atmosphere necessary to produce the desired increase in the pH of moisture in the enclosure depends upon a number of factors. The solubility of the ammonia gas in the enclosure moisture will be one factor in determining the desired ammonia gas content for a given enclosure atmosphere. The amount of moisture in the enclosure, the starting pH of the moisture in the enclosure, and the nature of other constituents that may be dissolved in or held with the moisture are other factors to be considered in determining the desired ammonia gas content for a given enclosure atmosphere. Other constituents making up the enclosure atmosphere may also have an impact on the content of ammonia gas in the enclosure atmosphere according to the invention. Furthermore, the temperature of moisture in a given enclosure will affect the ability of the moisture to absorb the ammonia gas from the enclosure atmosphere, and will thus be a factor in the determining the desired ammonia gas content in the enclosure atmosphere. Ammonia gas will go into solution in the moisture more readily at lower temperatures within the range used in meat chilling enclosures, for example, 35 to 45 degrees Fahrenheit. It is therefore advantageous to maintain the enclosure atmosphere and moisture in the enclosure at relatively low temperatures to generally reduce the ammonia gas content in the enclosure atmosphere necessary to produce the desired pH increase in moisture held in the enclosure.

It may be desirable to periodically spike or raise the content of ammonia gas in enclosure 111 for a spiking time period to produce a large and preferably sudden pH increase in moisture within the enclosure. It may also be desirable to periodically raise the content of the ammonia gas in the moisture within associated air handling enclosures such as conduit 301 and enclosure 302 shown in FIG. 3. The ammonia gas content may, for example, be raised for a period of time to an elevated content or concentration sufficient to raise the pH in moisture in enclosure 111 (or both the enclosure and associated air handling conduits and enclosures) to approximately 9.0 or above, and preferably 10.0 or above. The pH spiking time period at which the ammonia gas content is held at this elevated level may be approximately five (5) minutes to two (2) hours. Shorter periods of elevated pH increasing gas content are generally preferred to ensure that the meat products held in the enclosure are not adversely affected.

pH spiking according to the present invention may be performed periodically at fixed intervals. Alternatively, the pH spiking may be performed in response to some event. For example, the ammonia gas content in an enclosure may be held at a relatively high pH spiking or elevated level for an extended period of time (on the order of several hours) at the time an enclosure is put in service either initially, after being temporarily removed from service for maintenance operations on the enclosure or associated equipment, or in response to any event or circumstance that would allow elevated microbe levels to exist within the meat enclosure. This pH spiking may be performed with no meat in the enclosure or while meat products are held in the enclosure.

Regardless of the time at which the ammonia gas content is held at the elevated level, the elevated ammonia gas content level may be produced in several different fashions within the scope of the present invention. In one form of the invention, pH increasing material may be released at a relatively higher flow rate than used to maintain the desired lower or maintenance level of ammonia gas content. Alternatively or in addition to an increased flow rate, the concentration of pH increasing material may be temporarily increased. Where the pH increasing material comprises ammonium hydroxide for example, the pH of the solution may be increased from 9.0 to 10.0 or higher in order to increase the ammonia gas content in enclosure 111 for the desired spiking time period. In another form of the invention, the normal, relatively lower or maintenance ammonia gas content in the enclosure atmosphere may be produced by introducing ammonium hydroxide solution to enclosure 111, and ammonia gas or a mixture including ammonia gas may be introduced in addition to the ammonium hydroxide solution to produce the elevated pH increasing gas content. The ammonia gas or ammonia gas mixture may be directed from a separate supply 131 to release arrangement 133 under the control of flow control arrangement 132 as shown in FIG. 1.

After the desired pH spiking time period has elapsed, the invention includes reducing the ammonia gas content back down to a lower pH maintenance level. This ammonia gas content reduction may be accomplished by introducing an absorbant from absorbent supply 123 in FIG. 1. A pH decreasing material from supply 127 may be released into enclosure 111 alternatively to or in addition to the absorbent material to effect the desired ammonia gas content reduction, depending upon the nature of the pH decreasing material.

Especially where the pH increasing material comprises ammonium hydroxide solution added to the spray water together with carbon monoxide, the temperature of the spray water should be chilled at least to the temperature within enclosure 111. The spray water may also be chilled with a chiller such as chiller 119 in FIG. 1, to a temperature near but just above the freezing point of the spray water solution. However, the temperature of the spray water should not be so low as to cause meat products in enclosure 111 to freeze.

The method according to the present invention may also include the step of monitoring the carbon monoxide gas content in the enclosure atmosphere and any ammonia gas content in the enclosure atmosphere using a monitor such as that shown diagrammatically at 126 in FIG. 1. In preferred forms of the invention, monitoring provides a substantially continuous monitor output indicative of the carbon monoxide gas content and any ammonia gas content in the enclosure atmosphere. This monitor output signal, or a signal derived from the monitor output, is then supplied to the flow control arrangement 121 or other controls and used for controlling the addition of further carbon monoxide bearing spray water and pH increasing material to enclosure 111 to ensure no significant carbon monoxide content is maintained in the enclosure and to maintain the desired ammonia gas content in the enclosure atmosphere.

A gas content monitor output, or a signal derived from the monitor output, may also be used to control the removal of carbon monoxide gas and any excess ammonia gas from the enclosure atmosphere. In the form of the invention shown in FIG. 1, this removal of carbon monoxide gas and ammonia gas may be accomplished by releasing an absorbent material such as additional water from supply 123 into enclosure 111 to absorb carbon monoxide gas and any excess ammonia gas.

Alternatively, enclosure atmosphere may be temporarily removed from the enclosure being treated and excess ammonia gas and/or carbon monoxide gas molecules may be filtered or otherwise absorbed or removed from the atmosphere prior to being returned to the enclosure. As yet another alternative, the enclosure atmosphere may be vented as necessary to remove carbon monoxide gas and/or ammonia gas from the enclosure.

One preferred method according to the invention further includes the step of introducing, circulating, or directing the pH increasing material into the air handling conduits and other enclosures associated with the heat exchanger system for the meat chilling enclosure. The pH increasing material may be released directly into such air handling conduits and enclosures through the alternate pH increasing material release points 304 and 306 shown in FIG. 3. Releasing the pH increasing material directly into the handling conduits ensures that the ammonia gas is available to increase the pH of moisture collecting in the air handling enclosures. Other forms of the invention may rely on ammonia gas reaching the air handling enclosures in the course of normal circulation of enclosure atmosphere from the enclosure, through the air handling enclosures, and back to the meat chilling enclosure.

The method of the invention also encompasses the step of periodically cycling the pH of moisture in enclosure 11 from a pH above 7.0 for independent moisture to a relatively low pH below 7.0, for example, and then back to a pH above 7.0 and preferably at or above 8.0. This pH cycling may be accomplished by releasing the pH decreasing material from supply 127 in FIG. 1 into enclosure 111 through flow control arrangement 128. The pH decreasing material held in supply 127 preferably comprises carbon dioxide. The carbon dioxide may be released into enclosure 111 in gaseous or solid form or as a solution with water. In either case, the resulting carbon dioxide gas in enclosure 111 may combine with moisture in the enclosure to decrease the pH of the moisture. Of course, any carbonic acid solution combining with moisture in enclosure 111 will also result in a pH reduction in the moisture. During the time the pH decreasing material is being released into enclosure 111, introduction of the pH increasing material from supply system 118 and/or from separate supply 131 may be temporarily halted or reduced. Once sufficient pH decreasing material has been released into enclosure 111 to reduce the pH of moisture in the enclosure to the desired level or relative amount, additional pH increasing material from supply 118 and or separate supply 131 may be introduced into the enclosure to produce the desired pH increasing gas content in the enclosure atmosphere and increase the pH of moisture in the enclosure to the desired level, generally above 7.0 for independent moisture in the enclosure.

As with the pH increasing material, it will be appreciated that the pH decreasing material from supply 127 may also be released directly into air handling enclosures associated with the heat exchange system for enclosure 111. This release of pH decreasing material directly into air handling conduits and other enclosures helps ensure that the moisture in those conduits is subjected to the desired pH change. The pH decreasing material content in the enclosure atmosphere may also be monitored similarly to the above described monitoring for the pH increasing gas, and the monitor output may be used to control the release of pH decreasing material into enclosure 111.

The above described preferred embodiments are intended to illustrate the principles of the invention, but not to limit the scope of the invention. Various other embodiments and modifications to these preferred embodiments may be made by those skilled in the art without departing from the scope of the following claims.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised October 2005), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The invention claimed is:

1. A method including:
   (a) positioning one or more meat products in a meat chilling enclosure with an enclosure atmosphere around the one or more meat products in the meat chilling enclosure;
   (b) introducing spray water into the meat chilling enclosure while the one or more meat products are within the meat chilling enclosure, the spray water including a desired carbon monoxide content in solution and
   (c) reducing a carbon monoxide gas content in the enclosure atmosphere in the meat chilling enclosure by at least periodically removing carbon monoxide gas from the enclosure atmosphere while the one or more meat products are enclosed in the meat chilling enclosure, wherein the reduction in carbon monoxide gas content in the enclosure atmosphere maintains the carbon monoxide content in the enclosure atmosphere below a desired level while the one or more meat products are enclosed in the meat chilling enclosure.

2. The method of claim 1 wherein the desired carbon monoxide content in solution comprises approximately the maximum carbon monoxide content that is held in solution in the spray water at approximately the temperature of the spray water introduced into the meat chilling enclosure.

3. The method of claim 1 wherein the desired carbon monoxide content in solution comprises approximately the maximum carbon monoxide content that is held in solution in the spray water at a maximum temperature maintained in the meat chilling enclosure.

4. The method of claim 1 further including introducing a pH increasing material comprising either ammonia gas or an ammonium hydroxide solution into the meat chilling enclosure to create a desired ammonia gas content in an enclosure atmosphere within the meat chilling enclosure.

5. The method of claim 4 wherein the pH increasing material includes ammonium hydroxide solution within the spray water.

6. The method of claim 4 wherein the pH increasing material includes ammonium hydroxide solution introduced into the meat chilling enclosure separately from the spray water.

7. The method of claim 1 wherein reducing the carbon monoxide gas content in the enclosure atmosphere includes adding an absorbent material to the enclosure atmosphere.

8. The method of claim 7 wherein the absorbent material includes water.

9. The method of claim 1 further including monitoring the atmosphere within the enclosure for carbon monoxide gas content.

10. The method of claim 1 wherein reducing the carbon monoxide gas content in the enclosure atmosphere includes removing a portion of the enclosure atmosphere.

11. A method including:
(a) introducing a pH increasing material comprising either ammonia gas or an ammonia hydroxide solution into an enclosure atmosphere around one or more meat products positioned with a meat chilling enclosure to create a desired ammonia gas content in the enclosure;
(b) introducing a carbon monoxide and water solution into the enclosure atmosphere within the meat chilling enclosure;
(c) directing the enclosure atmosphere having the desired ammonia gas content through air handling enclosures associated with a heat exchanger system for the meat chilling enclosure;
(d) maintaining the desired ammonia gas content in the enclosure atmosphere by introducing more of the pH increasing material into the meat chilling enclosure while meat products are chilled in the meat chilling enclosure; and
(e) reducing a carbon monoxide gas content in the enclosure atmosphere by at least periodically removing carbon monoxide gas from the enclosure atmosphere while the one or more meat products are enclosed in the meat chilling enclosure, wherein the reduction in carbon monoxide gas content in the enclosure atmosphere maintains the carbon monoxide content in the enclosure atmosphere below a desired level while the one or more meat products are enclosed in the meat chilling enclosure.

12. The method of claim 11 wherein the pH increasing material includes ammonium hydroxide solution and wherein the carbon monoxide is in solution with the water making up the ammonium hydroxide solution.

13. The method of claim 11 wherein the carbon monoxide and water solution is introduced into the meat chilling enclosure separately from the pH increasing material.

14. The method of claim 11 wherein the desired ammonia gas content in the meat chilling enclosure atmosphere is at least approximately three parts per million.

15. The method of claim 11 further including:
(a) monitoring the ammonia gas content in the enclosure atmosphere to produce a monitor output indicative of the ammonia gas content in the enclosure atmosphere; and
(b) controlling the addition of pH increasing material to the enclosure in response to the monitor output.

16. The method of claim 15 further including removing ammonia gas from the enclosure atmosphere in response to the monitor output.

17. The method of claim 16 wherein removing ammonia gas from the enclosure atmosphere includes introducing a spray of water into the meat chilling enclosure so that ammonia gas is absorbed from the enclosure atmosphere.

18. The method of claim 11 further including monitoring the enclosure atmosphere for carbon monoxide gas content.

19. The method of claim 18 wherein reducing the carbon monoxide gas content in the enclosure atmosphere includes adding water to the enclosure atmosphere in response to a carbon monoxide monitor output produced by monitoring the enclosure atmosphere for carbon monoxide content.

20. The method of claim 18 wherein reducing the carbon monoxide gas content in the enclosure atmosphere includes removing a portion of the enclosure atmosphere in response to a carbon monoxide monitor output produced by monitoring the enclosure atmosphere for carbon monoxide content.

* * * * *